US011057796B2

(12) United States Patent
Bernstein et al.

(10) Patent No.: US 11,057,796 B2
(45) Date of Patent: Jul. 6, 2021

(54) EMPLOYING SELF ORGANIZING NETWORK (SON) TECHNIQUES TO MANAGE DATA OVER CABLE SERVICE INTERFACE SPECIFICATION (DOCSIS) BACKHAUL FOR SMALL CELLS

(71) Applicant: Cisco Technology, Inc., San Jose, CA (US)

(72) Inventors: Alon Shlomo Bernstein, Monte Sereno, CA (US); Aeneas Sean Dodd-Noble, Andover, MA (US); Alon Ben Ami, Gedera (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 130 days.

(21) Appl. No.: 16/402,548

(22) Filed: May 3, 2019

(65) Prior Publication Data
US 2020/0351717 A1 Nov. 5, 2020

(51) Int. Cl.
*H04W 28/20* (2009.01)
*H04W 84/18* (2009.01)
*H04W 28/10* (2009.01)
*H04W 28/02* (2009.01)
*H04W 24/08* (2009.01)
*H04W 40/02* (2009.01)
*H04W 16/32* (2009.01)

(52) U.S. Cl.
CPC .......... *H04W 28/20* (2013.01); *H04W 24/08* (2013.01); *H04W 28/0205* (2013.01); *H04W 28/0231* (2013.01); *H04W 28/10* (2013.01); *H04W 40/023* (2013.01); *H04W 84/18* (2013.01); *H04W 16/32* (2013.01)

(58) Field of Classification Search
CPC . H04W 28/10; H04W 28/20; H04W 28/0231; H04W 84/18
See application file for complete search history.

(56) References Cited

U.S. PATENT DOCUMENTS

| | | | |
|---|---|---|---|
| 8,639,260 | B2 | 1/2014 | Fox et al. |
| 8,717,983 | B2 | 5/2014 | Wei et al. |
| 9,445,421 | B2 | 9/2016 | Levine et al. |

(Continued)

*Primary Examiner* — Jamal Javaid
*Assistant Examiner* — Ryan C Kavleski
(74) *Attorney, Agent, or Firm* — Polsinelli PC

(57) ABSTRACT

A Centralized Self Organizing Network (C-SON) automation platform for managing a backhaul infrastructure in a telecommunication network. The C-SON automation platform monitors one or more backhaul utilization performance indicators corresponding to a backhaul infrastructure, which infrastructure transports data between one or more User Equipment (UE) connected to a small cell and a data network. The C-SON further receives subscriber data for at least one User Equipment (UE) and location data for the at least one UE from at least one Network Function (NF), and maps the at least one UE to a backhaul service flow and the small cell based on the subscriber data and the location data. The C-SON automation platform determines the backhaul utilization performance indicator exceeds a backhaul threshold limit for the backhaul service flow, and adjusts a bandwidth utilization of the backhaul infrastructure based on the backhaul utilization parameter exceeding the backhaul threshold limit.

20 Claims, 6 Drawing Sheets

(56) References Cited

U.S. PATENT DOCUMENTS

| | | | |
|---|---|---|---|
| 2011/0320631 A1* | 12/2011 | Finkelstein | H04L 47/22 |
| | | | 709/232 |
| 2012/0084371 A1* | 4/2012 | Rajagopalan | H04L 41/5054 |
| | | | 709/206 |
| 2016/0057679 A1* | 2/2016 | Werner | H04W 52/04 |
| | | | 455/444 |
| 2017/0019811 A1* | 1/2017 | Parulkar | H04L 41/0654 |
| 2018/0192345 A1 | 7/2018 | Yun et al. | |
| 2020/0328944 A1* | 10/2020 | Zhang | H04L 41/12 |
| 2020/0344606 A1* | 10/2020 | Zaus | H04W 12/06 |

* cited by examiner

EMPLOYING SELF ORGANIZING NETWORK (SON) TECHNIQUES TO MANAGE DATA OVER CABLE SERVICE INTERFACE SPECIFICATION (DOCSIS) BACKHAUL FOR SMALL CELLS

TECHNICAL FIELD

The present subject matter relates generally to telecommunication networks, and more particularly, to employing Self-Organizing Network (SON) techniques in the context of a Data Over Cable Service Interface Specification (DOCSIS) backhaul infrastructure.

BACKGROUND

Recently, a transition is underway from existing 4G/LTE networks to new 5G networks, which includes a new service-oriented architecture for provisioning network services/resources in a dynamic, scalable, and customizable fashion (e.g., micro-services, network functions virtualization (NFV), etc.). While small cells will play a critical role in delivering high bandwidth, low-latency connections required by the various 5G use cases, one of the major costs incurred when building a mobile network and deploying these small cells is the mobile backhaul infrastructure. Indeed, the backhaul infrastructure accounts for 61% of the cost per GB when deploying a small cell network. In an effort to reduce the backhaul infrastructure costs, mobile service providers are currently attempting to leverage existing wireline or backhaul infrastructure to provide transport services comparable to fiber performance at a significant economic advantage. However, the access technologies for the wireline networks and the new 5G mobile networks operate in different network architectures (e.g., with different core network entities). These differences present new opportunities to improve network convergence, resource usage, overall bandwidth allocation, and so on.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

Figure 1:
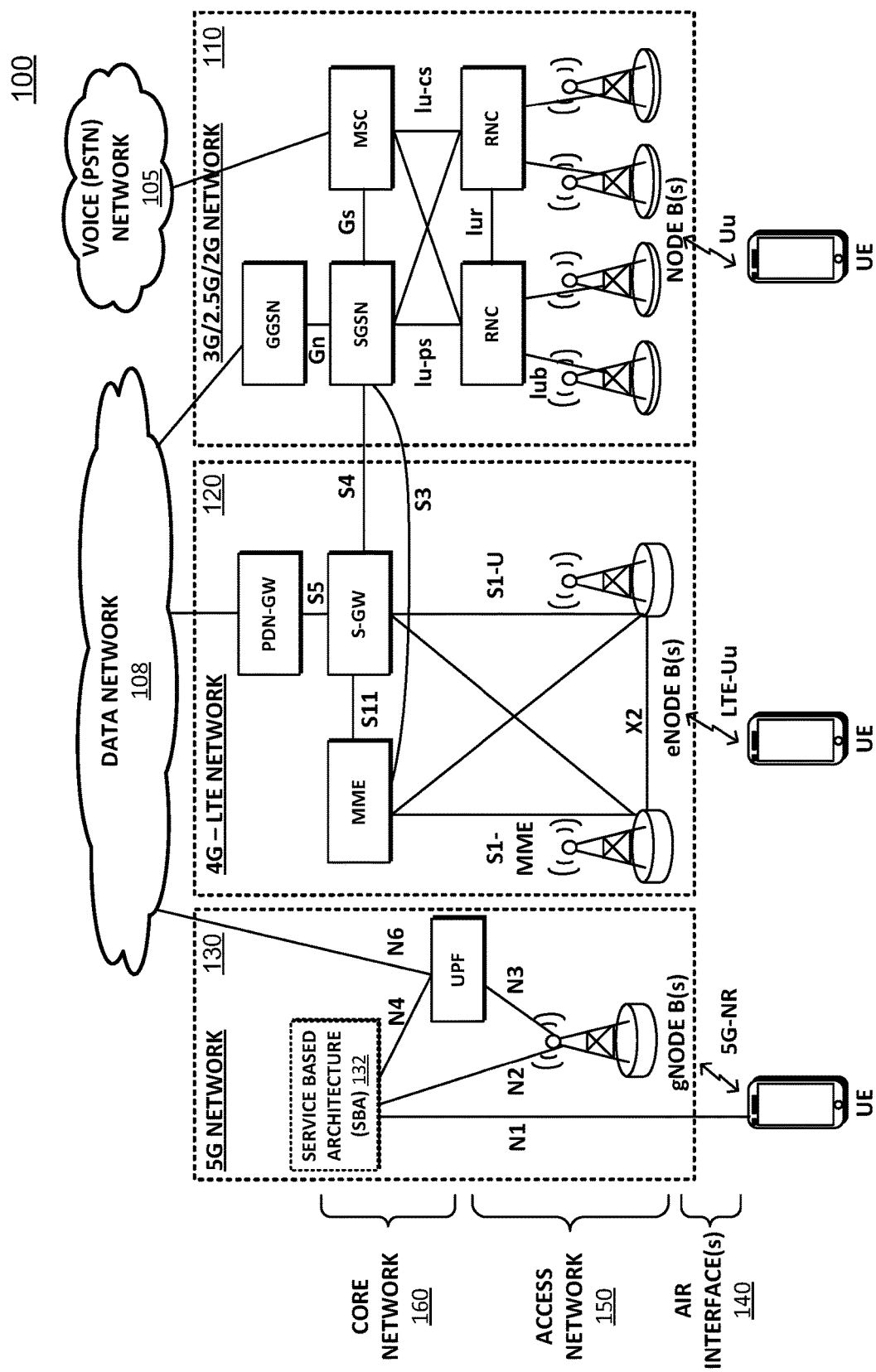
FIG. 1 illustrates a schematic block diagram of exemplary telecommunication networks, including a 3G network, a 4G network, and a 5G network.

This disclosure describes techniques for employing a Centralized Self-Organizing Network (C-SON) automation platform to manage a backhaul infrastructure in a telecommunication network (e.g., 5G network, etc.). In particular, the C-SON automation platform monitors one or more backhaul utilization parameters corresponding to a backhaul infrastructure (e.g., the infrastructure for transporting data between one or more User Equipment (UE) connected to a small cell and a data network). In some examples, the C-SON automation platform monitors the utilization key performance indicators over new network interfaces in the backhaul infrastructure (e.g., between the C-SON automation platform/cable modems, and/or between the C-SON automation platform/Cable Modem Termination System (CMTS)). The C-SON also receives subscriber data for at least one User Equipment (UE) and location data for the at least one UE from at least one Network Function (NF), again over new network interfaces between the C-SON automation platform and the new 5G core network (Service Based Architecture (SBA)). The C-SON further maps the at least one UE to a backhaul service flow and the small cell based on the subscriber data and the location data, and determines whether the backhaul utilization performance indicator exceeds a backhaul threshold limit for the backhaul service flow. If the backhaul utilization performance indicator exceeds the backhaul threshold limit, the C-SON automation platform adjusts a bandwidth utilization of the backhaul infrastructure. The threshold limit is a configurable parameter that can be set by the service provider according to its policy.

DESCRIPTION

Various examples of the disclosure are discussed in detail below. While specific implementations are described in detail, it should be understood that this is done for illustration purposes only. A person skilled in the relevant art will recognize that other components and configurations may be used without departing from the spirit and scope of the disclosure.

As provided herein, this disclosure relates to communication networks (e.g., telecommunication networks), and more particularly, to employing Self-Organizing Network (SON) techniques in the context of backhaul infrastructure (e.g., wireline, hybrid fiber-coaxial (HFC), Data Over Cable Service Interface Specification (DOCSIS), etc.). As described in greater detail below, the communication networks and backhaul infrastructure include a number of network devices/modules/entities, which may be referred to as "Network Function(s)" (NF(s)), as is appreciated by those skilled in the art.

In this context, a NF can be implemented either as a network element on a dedicated hardware, as a software instance running on a dedicated hardware, or as a virtualized function instantiated on an appropriate platform, e.g. on a cloud infrastructure. For sake of clarity, the NFs described herein are based on NFs specified by existing Technical Specifications (TS(s)) or Technical Reports (TR(s)), such as the 3GPP TS 23.501, TS 23.502, TR 23.716 TS 24.501, TS 29.509, TS 29.510, TS 29.518, TS 33.301, TS 33.402, TS 33.501, TR 38.801, each of which is incorporated herein by reference to its entirety. Moreover, while some operations and functionality may be described and/or attributed to a particular NF, it is appreciated that such operations are not intended to be limited to the particular NF, but may be performed by other NFs as appropriate, particularly in view of the ongoing development and evolving nature of telecommunication networks.

A communication network is a geographically distributed collection of nodes interconnected by communication links and segments for transporting data between end nodes, such as mobile devices, computers, personal computing devices (and so on), and other devices, such as network entities, sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc. Some communication networks can include telecommunication networks, which transport data between end nodes, such as user equipment (UE), which can include mobile devices.

FIG. 1 illustrates a schematic block diagram of exemplary telecommunication networks 100, including a 3G network 110, a 4G network 120, and 5G network 130. Telecommunication networks 100 include wireless network interfaces or communication links, such as air interfaces 140, an access network 150, which represents radio infrastructure or radio towers (e.g., including the various hauling infrastructures), and a core network 160, which represents respective core network entities, network modules, or Network Functions (NF(s)). The wireless network interfaces or air interfaces 140 include Uu links for 3G network 110, LTE-Uu links for 4G network 120, and 5G-NR links for 5G network 130. In addition, other network interfaces (e.g., Nx, Sx, Lu-x, Gx, etc.) generally interconnect certain nodes (e.g., UE and/or core network entities) with other nodes (e.g., other UE and/or core network entities) based on, for example, distance, signal strength, network topology, current operational status, location, etc. As is appreciated by those skilled in the art, the network interfaces are vehicles for exchanging data packets (e.g., traffic and/or messages) between the nodes using predefined network protocols such as known wired protocols as appropriate. In this context, a protocol consists of a set of rules defining how the nodes interact with each other.

Those skilled in the art will understand that any number of nodes, devices, communication links, and the like may be used, and that the view shown herein is for simplicity. In particular, the representations of telecommunication networks 100, including respective interconnected network entities, are illustrated and described herein for purposes of discussion, not limitation, and it is appreciated that the illustrated networks can include (or exclude) any number of network entities, communication links, and the like, and can support inter-network operability and compatibility.

Access network 150 represents the infrastructure or radio towers, such as a Radio Access Network (RAN), for receiving and transmitting data packets between end user equipment (UE) as well as the various network entities (e.g., core network entities). Access network 150 includes NodeBs (NBs) for 3G network 110, eNodeBs (eNBs) for 4G network 120, and gNodeBs (gNBs) for 5G network 130. The infrastructure for each network may support different functionality and it is appreciated that infrastructure illustrated within one network can include appropriate hardware/software to support functionality of other telecommunication networks. In addition, as described in greater detail below, access network 150 can include various hauling infrastructure, such as fronthaul, midhaul, backhaul, and the like. In this context, each hauling infrastructure transports data between adjoining infrastructure/networks. For example, the backhaul infrastructure refers to portions of a network that includes intermedia links between a core network (e.g., core network 160) and small subnetworks at an edge of the network (e.g., at the radio towers).

Respective network entities that form core network 160 (within the telecommunication networks 100) operatively connect respective RAN infrastructure (such as: NBs, eNBs, gNBs) to third party networks such as a voice network 105 (e.g., a Public Switched Telephone Network (PSTN) network) and/or a data network 108 to create end-to-end connections. Prior to 3G (e.g., 2G, 2.5G, etc.) the third party network primarily included a voice network/PSTN 105 (e.g., a circuit switched network). From 3G onward, the third party network transitioned to include a public network (e.g., the Internet), represented by data network 108 (e.g., a packet switched network). Core network 160 and its respective network entities collectively operate to manage connections, bandwidth, and mobility for respective UE.

Notably, core network 160 evolved along three functional planes, including service management, session management, and mobility management. Service management for 2G and 3G networks includes operations to create an Integrated Services Digital Network (ISDN) over wireless links (e.g., Uu links). Session management for 3G and 4G networks generally include operations establish, maintain, and release network resources (e.g., data connections). In particular, in 3G network 110, session management includes a standalone General Packet Radio Service (GPRS) network, while 4G network 120 introduced a fully integrated data only network optimized for mobile broadband (where basic telephone operations are supported as one profile). Mobility management generally includes operations that support movement of UE in a mobile network, such as system registration, location tracking and handover (e.g., often optimized reduce heavy signaling loads). For example, in the context of 4G network 120, a Serving Gateway (SGW) and a Packet Data Gateway (PGW) support session management operations while mobility management operations (which maintains data sessions for mobile UE) are centralized within a Mobility Management Entity (MME).

5G network 130, as discussed herein, introduces a new service base architecture (SBA) 132, which generally redistributes functionality of 4G network entities into smaller service-based functions/network entities. In addition, packet routing and forwarding functions (which are performed by SGW and PGW in 4G network 120) are realized as services rendered through a new network function/entity called the User Plane Function (UPF). In this fashion, 5G network 130 provides a modular set of services that support dynamic and scalable deployment of resources to satisfy diverse user demands.

Figure 2:
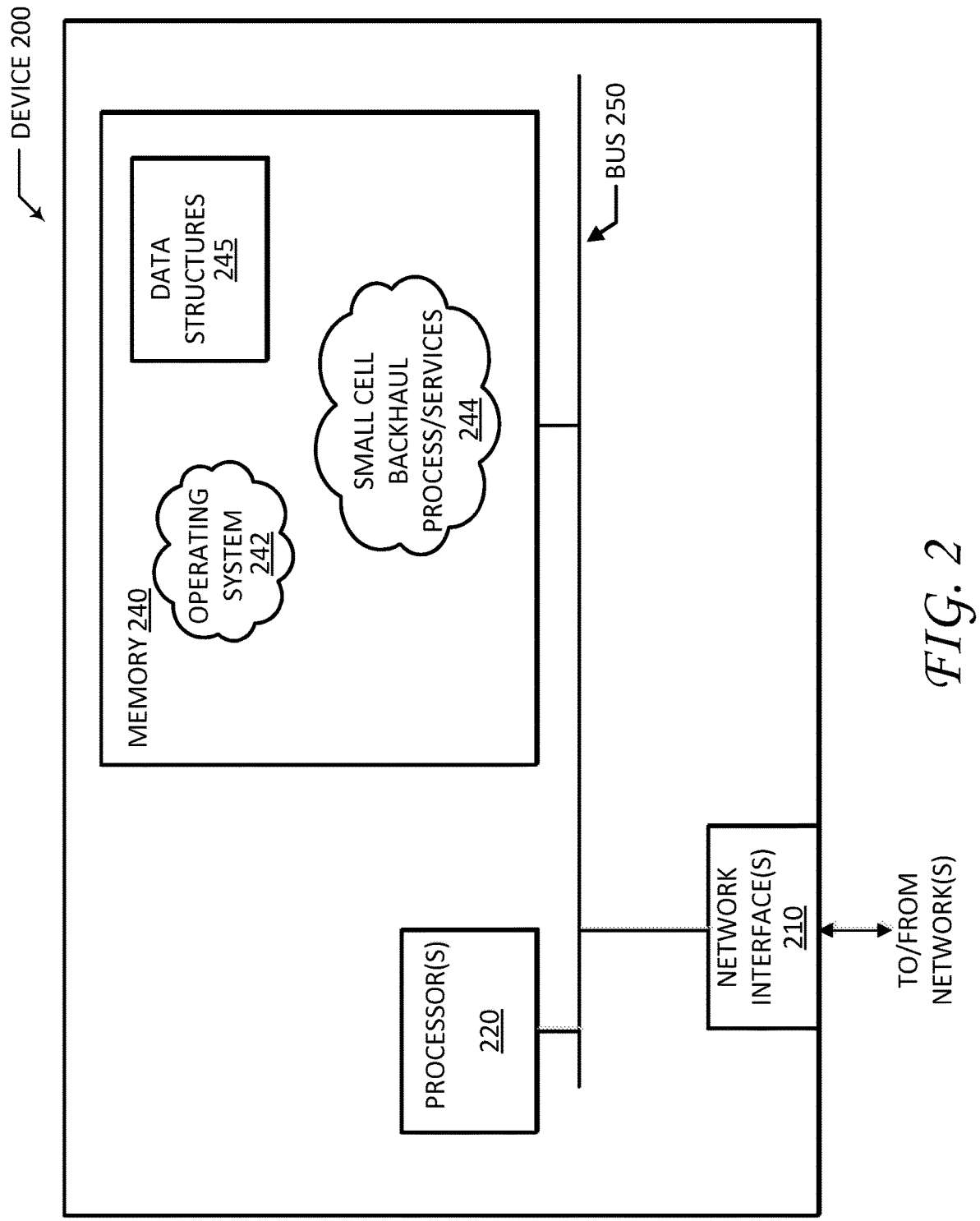
FIG. 2 illustrates a schematic block diagram of network automation entity n, such as a Centralized Self-Organizing Network (C-SON) entity for an automation platform, according to one or more examples of this disclosure.

FIG. 2 illustrates a schematic block diagram of an exemplary network automation entity 200, which can represent a Network Function (NF) which may be employed in accordance with one or more examples described herein. For example, device 200 can represent a network entity (or NF) such as a Centralized Self Organizing Network (SON) (C-SON) entity (e.g., a controller) for an automation platform and/or a Distributed (e.g., de-centralized) SON (D-SON) entity that is integrated and distributed amongst various NFs and/or backhaul network components. For purposes of discussion, reference is made herein to the C-SON entity example. It is further appreciated that the C-SON entity can represent a "controller" in the context of a SON, and/or it can represent any number of other SON functional entities for an automation platform. With respect to the automation platform, it represents a closed loop platform that contains an infrastructure layer for collecting data from different domains, a controller for changing different domains configuration (e.g., corrective actions, etc.), and an algorithm layer which runs business value added target functions, as is appreciated by those skilled in the art.

The illustrative device 200 comprises one or more network interfaces 210, at least one processor 220, and a memory 240 interconnected by a system bus 250. Network interface(s) 210 contain the mechanical, electrical, and signaling circuitry for communicating data over links (e.g., wires or wireless links) within the telecommunication networks 100 (e.g., ref. FIG. 1). Network interfaces 210 may be configured to transmit and/or receive data using a variety of different communication protocols, as will be understood by those skilled in the art.

Memory 240 comprises a plurality of storage locations that are addressable by processor 220 for storing software programs and data structures associated with the examples described herein. Processor 220 may comprise necessary elements or logic adapted to execute the software programs and manipulate data structures 245. An operating system 242, portions of which are typically resident in memory 240 and executed by processor 220, functionally organizes the device by, inter alia, invoking operations in support of services and/or software processes executing on the device. These services and/or software processes may comprise an illustrative "small cell backhaul" process/service 244, as described herein. Note that while small cell backhaul processes/services 244 are shown in centralized memory 240, some examples provide for these processes/services to be operated as part of a distributed communication network (e.g., as part of a decentralized D-SON), as is appreciated by those skilled in the art.

Illustratively, the techniques described herein may be performed by hardware, software, and/or firmware, such as in accordance with the small cell backhaul process 244, which may contain computer executable instructions executed by processor 220 to perform functions relating to efficiently managing backhaul infrastructure (e.g., backhaul utilization, bandwidth, resource usage, load balancing, and the like), as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having process 244 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

As noted above, the different access technologies for wireline/backhaul networks and the new 5G networks present interoperability challenges, particularly when deploying small cells. For example, one interoperability challenge relates to securing and efficiently managing the necessary backhaul connectivity (or transport) between a small cell and the 5G core network.

Figure 3:
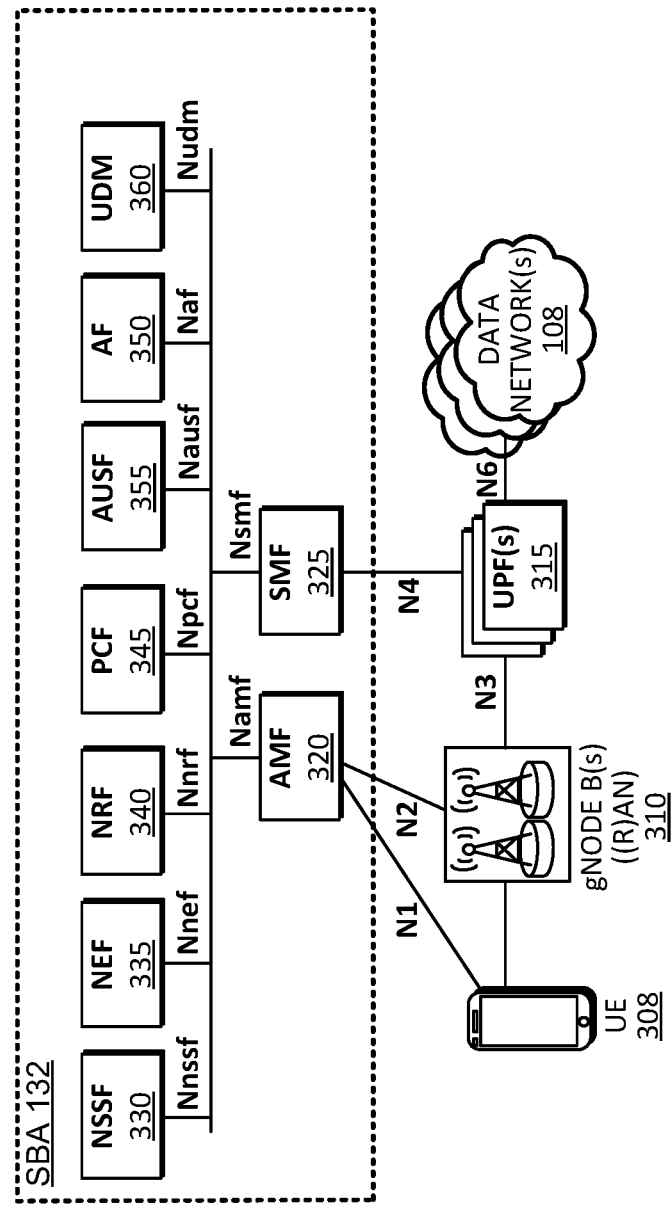
FIG. 3 illustrates schematic block diagram of a service based architecture (SBA) for a 5G network.

FIG. 3 illustrates a schematic block diagram 300, showing core network entities of an SBA architecture (e.g., SBA 132) for an exemplary network (e.g., 5G network 130). As shown, the network entities or NFs that form SBA 132 include, for example, AMF 320, SMF 325, Network Slice Selection Function (NSSF) 330, Network Exposure Function (NEF) 335, Network Repository Function (NRF) 340, Policy Control Function (PCF) 345, and Application Function (AF) 350, an Authentication Server Function (AUSF) 355, and a Unified Data Management (UDM) 360. These network entities can be implemented either as a network element on a dedicated hardware, as a software instance running on a dedicated hardware, or as a virtualized function instantiated on an appropriate platform, e.g., a cloud infrastructure, as is appreciated by those skilled in the art.

In general, UE 308 connects to RAN/Access Network (AN) 310 as well as AMF 320. In this context, a RAN can include a base station while an AN can include a base station supporting non-3GPP access, e.g., Wi-Fi access. After UE 308 attaches to AMF 320, AMF 320 further communicates with UDM 360 to obtain a profile or subscription data for UE 308. AMF 320 operates to provide UE-based authentication, authorization, mobility management, etc.

SMF 325 is responsible for session management, IP address allocation to UE(s), and traffic management/selection of a User Plane Function (UPF) (e.g., UPF 315) for proper routing/data transfer to corresponding data network(s) 108. Notably, if UE 308 has multiple sessions, different SMFs may be allocated to each session for individual management and/or different functionality per session.

AF 350 generally provides information on packet flows to PCF 345, which is responsible for policy control in order to support Quality of Service (QoS). PCF 345 determines policies about mobility and session management for proper AMF/SMF operations. AUSF 355 stores authentication data for UE 308, and UDM 360 stores subscription data for UE 308. Data network 108 provides Internet access or operator services.

UDM 360 is responsible for services related to users and subscriptions. For example, UDM 360 can generate 3GPP AKA authentication credentials, handle user identification related information, manage access authorization (e.g. roaming restrictions), register the user serving NFs (serving AMF, Session Management Function (SMF)), support service continuity by keeping record of SMF/Data Network Name (DNN) assignments, support Lawful Interception (LI) procedures in outbound roaming by acting as a contact point and performs subscription management procedures, and so on.

Collectively, the various NFs that form SBA 132 cooperate to register and attach UE 308 to SBA 132 by selecting and establishing an appropriate UPF (e.g., UPF 315) for a PDU session based on UE mobility and connectivity related events (e.g., for a particular network slice, etc.).

For example, in operation, UE 308 initiates session establishment by sending a PDU session request data to AMF 320 over an NG1 NAS network interface (e.g., as part of a PDU Session Establishment Request message). Session management messages can be transmitted with the mobility management message supported by the NAS routing capability within AMF 320. Although AMF 320 is involved in sending session management messages, processing mobility messages and session management messages typically occurs in AMF 320 and SMF 325, respectively.

AMF 320 receives the PDU session request and discovers/selects an appropriate SMF (e.g., SMF 325) based on parameters included in the initial PDU session request from UE 308, such as session management service identification data, Single Network Slice Selection Assistance Information (S-NSSAI) data, Data Network Name (DNN) data, UE subscriptions, local operator policies, etc.

Here, AMF 320 selects SMF 325 and establishes a PDU session, which allocates PDU resources for a relevant network slice and permits data transmission/data packet exchanges between UE 308 and data network 108. In addition, AMF 320 also ensures that NAS signaling associated with this PDU session is handled by the same SMF (SMF 325) by assigning a PDU session identifier to the PDU session. UE 308, in turn, uses this PDU session identifier to route messages to the correct SMF.

PDU sessions are typically managed as part of a connectivity service (e.g., PDU Connectivity Service), which defines rules for exchanging data packets (e.g., Protocol Data Units (PDUs)) between the UE (e.g., UE 308) and a data network (e.g., data network 108) based on session-specific Quality of Service (QoS) parameters. This connectivity service can include multiple PDU sessions, which are logical associations created between the 5G core network entities (e.g., SBA 132) and UE 308 to handle data packet exchanges. In the context of a 5G network, session management is flexible, scalable, and accommodates various service continuity modes (e.g., "make before break" options, relocation of core network functions, etc.) while maintaining seamless end-user services. The session management also supports concurrent local and central access to a data network and multi-access edge computing where an application at an edge data centre can influence traffic routing to improve its performance.

Each PDU Session typically supports a single PDU Session type, e.g., the exchange of a single type of PDU requested by UE 308 at the establishment of the PDU Session. PDU Sessions are generally established upon UE request, modified upon UE 308/SBA 132 request, and released upon UE 308/SBA 132 request using NAS session management signaling exchanged over the N1 network interface between UE 308 and SMF 325. SBA 132 is able to trigger a specific application in UE 308 based on a request from an Application Server. UE 308 receives a trigger message and passes it to an appropriate application executing in UE 308. The application in UE 308 may establish a PDU Session to a specific DNN, in accordance with 3GPP TS 32.501, clause 4.4.5.

SMF 325 is responsible of checking whether UE requests are compliant with the user subscription. For this purpose, SMF 325 retrieves and requests to receive update notifications on SMF level subscription data from UDM 360. This subscription data can indicate (e.g., per DNN and per S-NSSAI) allowed PDU Session Types and the default PDU Session Type, allowed SSC modes and the default SSC mode, QoS Information, subscribed Session-AMBR, Default 5QI and Default ARP, static IP address/prefix, subscribed User Plane Security Policy, Charging Characteristics to be associated with the PDU Session, and so on. The foregoing operations (and additional functionality) for respective network entities can be found in 3GPP Technical Specification (TS) 23.501 and TS 23.502.

In addition, while session management is illustrated and described in the context of 5G networks (e.g., PDU sessions), it is appreciated such session management and related operations can readily apply to 4G networks (e.g., PDN sessions, etc.) For example, as is appreciated by those skilled in the art, 4G networks create sessions using default data bearers (e.g., 4G networks), while the 5G networks establish a PDU session as-needed or on demand, independent of UE attachment procedures. Further, UE(s) can establish multiple PDU sessions to the same data network (or to different data networks) over a single or multiple access networks (e.g., 3GPP networks, non-3GPP networks, etc.) where each PDU session is associated with network slice—e.g., one S-Network Slice Selection Assistance Information (S-NSSAI) and one Data Network Name (DNN). Notably, the PDU sessions can include various session types (e.g., IPv4, IPv6, Ethernet, unstructured, etc.)

Figure 4:
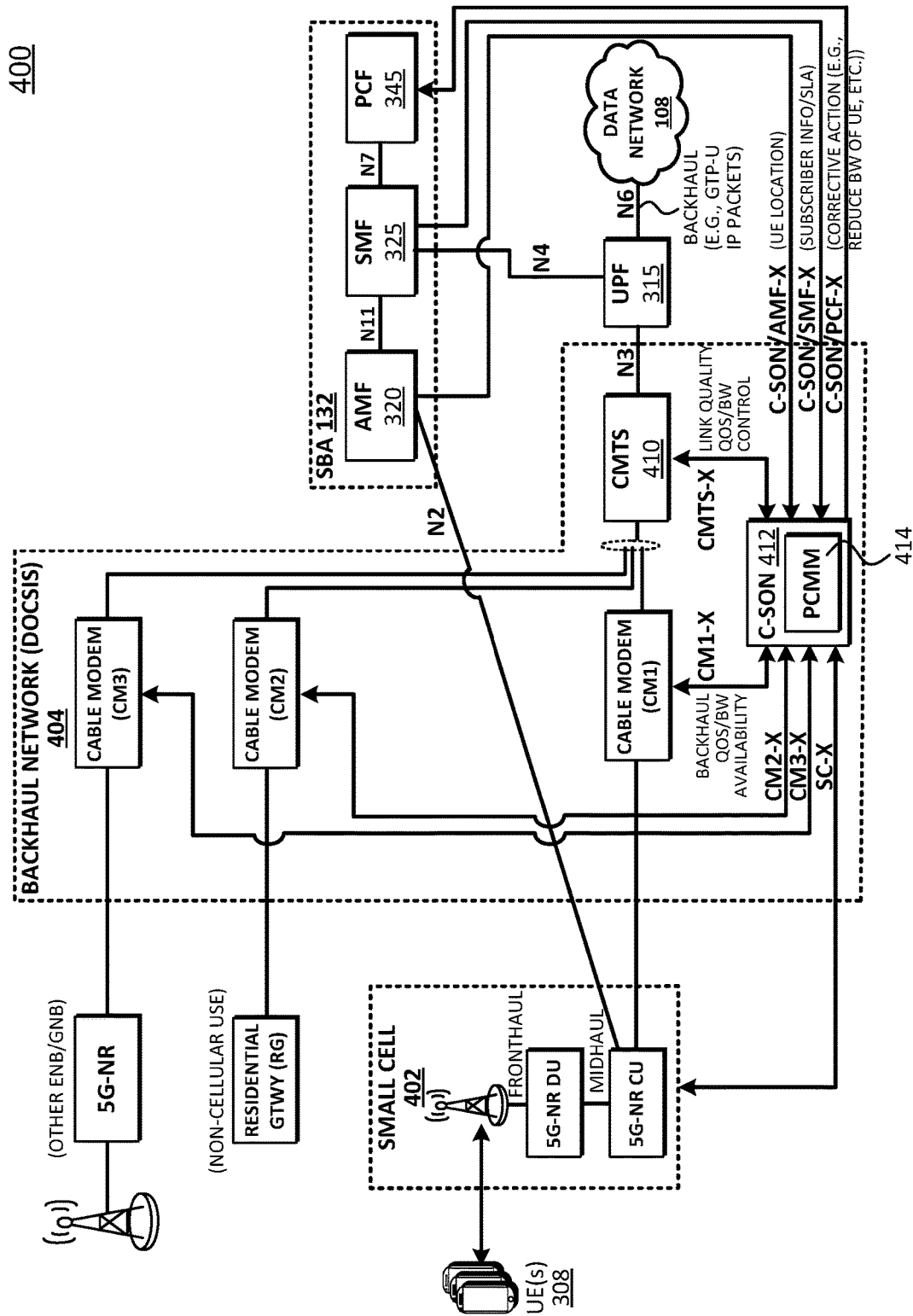
FIG. 4 illustrates a schematic block diagram of a hauling infrastructure (e.g., fronthaul, midhaul, backhaul) for an example telecommunication network, such as a 5G network, showing new network interfaces and operations performed by a C-SON entity (e.g., controller) for an automation platform device.

FIG. 3 illustrates network entities or NFs that form a 5G core network—e.g., SBA 132—and it is appreciated that a number of these NFs are also applicable to, and can be employed by a cable access network or a backhaul network, as shown in FIG. 4.

FIG. 4 illustrates a schematic block diagram of an example telecommunication network 400, which includes a small cell 402, a backhaul network 404 (e.g., a DOCSIS network), and various network entities or Network Functions (NFs) from SBA 132. In general, telecommunication network 400 shows the underlying hauling infrastructure for transporting messages between UE(s) 308 and data network 108.

In general, UE(s) 308 exchanges wireless data with small cell 402, and small cell 402 transforms the wireless data into wireline data. As shown, small cell 402 is represented by two New Radio(s) (NR(s))—e.g., a 5G-NR Central Unit (CU) and a 5G-NR Distributed Unit (DU)—which functionally perform different Radio Access Network operations, as described by 3GPP TR 38.801. In general, the 5G-NR CU and the 5G NR DU accommodate a number of hardware implementations, coordinate performance features, enable load management, improve real-time performance optimization, and support Software-Defined Networking (SDN) and Network Function Virtualization (NFV) architectures.

From small cell 402, the wireline data is further transported (e.g., "hauled") over a fronthaul infrastructure, a midhaul infrastructure, and a backhaul infrastructure (e.g., backhaul network 404) to a User Plane Function (UPF) 308. UPF 308, as discussed, generally performs operations such as packet routing and forwarding, packet inspection, QoS handling, and mobility anchoring to connect UE 306 to a corresponding data network 108 (and/or to a corresponding network slice or backhaul service flow). Notably, the traffic for a data session transported over backhaul network 404, and between a given UE (UE 308) and a selected UPF (UPF 315), can be referred to as a "backhaul service flow." This backhaul service flow can correspond to a PDU data session and/or a data network slice for UE 308.

Telecommunication network 400 also illustrates a number of NFs of SBA 132 employed to support backhaul network 404 operations. As shown, the various NFs of SBA 132 include AMF 320, SMF 325, and PCF 345. In operation, when UE 308 connects to small cell 402, UE 308 also connects to AMF 320 (e.g., either directly through an N1 interface (not shown) or through the N2 interface). As mentioned, AMF 320 configures access network parameters to associate the AN (e.g., here, small cell 402) with AMF 320. AMF 320 also manages the UE connections at the AN (e.g., over the N2 network interface), which includes PDU session management, session context which includes the Security Key, Mobility Restriction List, UE capability, and so on.

SMF 325 communicates with data network 108 over the N4 network interface, which can be considered as part of the cable access network and/or backhaul network 404 (although as shown, the N4 network interface is outside of the dash-lined box for backhaul network 404). SMF 325 associates with UPF 315 and exchanges capabilities and configuration as appropriate. Here, SMF 325 can setup the PDU session and provide IP address management, policy, charging and service configuration. However, it is also appreciated that SMF 325 operations may be extended to accommodate the disclosed small cell backhaul process/service (e.g., small cell backhaul process 244).

PCF 345 is responsible for policy control to support Quality of Service (QoS), and can determine policies about mobility and session management for proper AMF/SMF operations.

Importantly, backhaul network 404 provides the network infrastructure for transporting data between small cell 402 and UPF 315/data network 108. Backhaul network 404 particularly includes a number of Cable Modems, CM1, CM2, and CM3, as well as a Cable Modem Termination System (CMTS) 310. CM(s) 1-3 represent network bridges that facilitate bi-directional data communications over a hybrid fibre-coaxial (HFC) infrastructure. For example, CM(s) 1-3 can deliver broadband Internet access (e.g., access to UPF 308/data network 108) in the form of cable Internet as well as new IP based messages for 5G networks.

CMTS 410 represents a router that connects a cable network (e.g., backhaul network 404) to the IP backbone network (e.g., data network 108). CMTS 410 generally controls the DOCSIS MAC layer and enforces the quality of service (QoS) limits that a cable operator guarantees to its subscribers. Notably, CM1-CM3 can connect to CMTS 410 over a shared medium. CMTS 410 also communicates with UPF 315 over an N3 network interface. The N3 interface is for transporting user plane traffic, as is appreciated by those skilled in the art. For example, an access network and UPF 315 use a tunnel to encapsulate the UE's datagram to allow the UE to have any IP address or even Ethernet or other non-IP traffic over the N3 interface. QoS is marked in a packet so that the access network can prioritized the traffic based on policies applied in the UPF.

Backhaul network 404 also includes a Centralized Self Organizing Network (SON) (C-SON) automation platform 412, which is interconnected with small cell 402, CMs 1-3, CMTS, and the illustrated NFs of SBA 132—namely, AMF 320, SMF 325, and PCF 345, over respective communication links or network interfaces.

As shown, C-SON automation platform 412 can further include a PacketCable MultiMedia (PCMM) entity 414, which may be a component part of C-SON automation platform 412, or may be operable/employed as a standalone (but interconnected) entity or module. PCMM 414 provides enhanced QoS for multimedia applications, voice, and bandwidth-intensive services over a DOCSIS network, such as the illustrated backhaul network 404. PCMM 414 can further include a number of sub-components or sub-modules (not shown), which collectively provide time and volume based network resource authorizations, event-based network resource auditing and management functions, and/or management of service flows to support secure, network-based QoS.

The communication links or network interfaces for respective network entities or NFs include a C-SON/AMF-x interface for communicating signals between C-SON automation platform 412 and AMF 320. For example, C-SON can receive UE location information from AMF 320 over the C-SON/AMF-x interface. The C-SON/SMF-x interface interconnects C-SON automation platform 412 with SMF 325 and transports subscriber information (e.g., service level agreement (SLA), etc.) or subscriber data there-between. The C-SON/PCF-x interface interconnects C-SON automation platform 412 and PCF 345 and transports corrective action signals there-between. For example, C-SON automation platform 412 can instruct PCF 345 to reduce the bandwidth usage for a particular UE and/or for a particular PDU session based on monitored bandwidth utilization parameters (e.g., received from CM1 over CM-x1 and/or CMTS over CMTS-x). Notably, while the network interfaces C-SON/AMF-x, C-SON/SMF-x, C-SON/PCF-x are illustrated as separate interfaces, it is appreciated that these network interfaces can form a single or shared network interface that communicates with the entities or NFs of SBA 132 through, for example, a Network Exposure Function (NEF) such as NEF 335, etc.

In addition to the network interfaces to SBA 132, C-SON automation platform 412 also communicates with CM1, CM2, and CM3 over a CM1-x network interface, a CM2-x network interface, and a CM3-x network interface, respectively. For example, C-SON automation platform 412 monitors various backhaul utilization parameters for backhaul network 404, including backhaul QoS parameters, bandwidth availability, and so on, for respective cable modems (CMs1-3) over the respective network interfaces (CM1-x, CM2-x, CM3-x).

C-SON automation platform 412 also communicates with CMTS 410 and monitors additional backhaul utilization performance indicators such as link quality QoS and/or bandwidth control parameters over a CMTS-x network interface.

In operation, C-SON automation platform 412 performs or executes the disclosed small cell backhaul process/service (e.g., process 244), whereby C-SON automation platform 412 monitors one or more backhaul utilization performance indicators corresponding to a backhaul infrastructure (e.g., backhaul network 404). Notably, backhaul utilization performance indicators can include, for example, bandwidth availability, a number of subscribers or UE(s) for a given cable modem (CM), QoS at a given cable modem, and so on.

C-SON automation platform 412 further receives, from SBA 132, subscriber data for at least one UE (e.g., UE 308) as well as location data for UE 308. Here, C-SON automation platform 412 receives the subscriber data for UE 308 from SMF 325 over the C-SON/SNIF-x network interface, and receives the UE location data for UE 308 from AMF 320 over the C-SON/AMF-x network interface.

C-SON automation platform 412 further maps the backhaul service flow (e.g., portions of traffic between small cell 402 and UPF 305) to UE 308 based on the subscriber data and the location data. In some examples, the backhaul service flow may further correspond to a PDU session and/or a network slice for UE 308. For example, C-SON automation platform 412 can map data packets over the N3 interface to UE 308. Here, PCMM entity 414 can act as an application manager that assists with the mapping. A system (SON or other) can create a backhaul service flow by sending PCMM a service flow creation request that includes a 5 touple "classier" of a packet (PI destination, IP source, TCP/UDP input port, TCP/UDP output port, DSCP code point), and a SLA (service level agreement). The backhaul service flow has a "gate ID" that can be used to update the SLA of the service flow. Any flow that matches the "classier" will automatically be sent on the required service flow. This is a general PCMM framework for any application to control data flows through the CMTS 410.

C-SON automation platform 412 also determines whether the backhaul utilization performance indicator exceeds a backhaul threshold limit for the backhaul service flow. For example, the backhaul utilization parameter can represent an available bandwidth, a number of subscribers or UE(s) for a given small cell (e.g., small cell 402). If the backhaul utilization parameter exceeds the backhaul threshold limit, C-SON automation platform 412 takes corrective action. In this fashion, C-SON automation platform 412 monitors traffic (e.g., data packets) for a backhaul service flow, maps the backhaul service flow to a specific end-user (e.g., UE 308), and further monitors backhaul utilization performance indicators (e.g., radio utilization, bandwidth performance, and other QoS parameters) for the end-user. This granular approach provides end-to-end monitoring and management of data sessions between a user (e.g., UE 308) and a corresponding data network (e.g., data network 108).

With respect to corrective action, C-SON automation platform 412 can, for example, adjust the bandwidth utilization of the backhaul infrastructure (e.g., backhaul network 404) by adding more bandwidth to the DOCSIS link (e.g., through PCMM 414), load balance the UE at small cell 402 by migrating some UE to a macrocell (e.g., instructing small cell 402 to load balance over an SC-x network interface) and/or migrating some UE to another small cell (not shown), requesting PCF 345 to reduce the bandwidth of the UE (e.g., by changing the maximum allowed bit rate, etc.), and so on. For example, C-SON automation platform 412 can change a mobility parameter, which can trigger a load balancing operation by the small cell which can further cause the UE to hand over or reselect a macrocell (or another small cell). As another example of the corrective actions, and in the context of the PCMM entity 414, a gate-set command can be used to change QoS parameter—see e.g., diagram 10.2 in the PKT-SP-MM Packet Cable Multimedia Specification, available at https://specification-search.cablelabs.com/pack-etcable-multimedia-specification, which is incorporated herein by reference to its entirety. In this example, the PCMM entity 414 can use a "change the Bandwidth" operation. For example, if we have a 100 mbps that is 90% utilized we can choose to increase the amount of BW to 200 mbps, so now the utilization would drop. By increasing the Bandwidth to 200 mbps we reduced the utilization to 45% (e.g., 90% of 100 mbps is 90 mbps, and 90 mbps out of 200 mbps is 90×100/200=45%).

Figure 5:
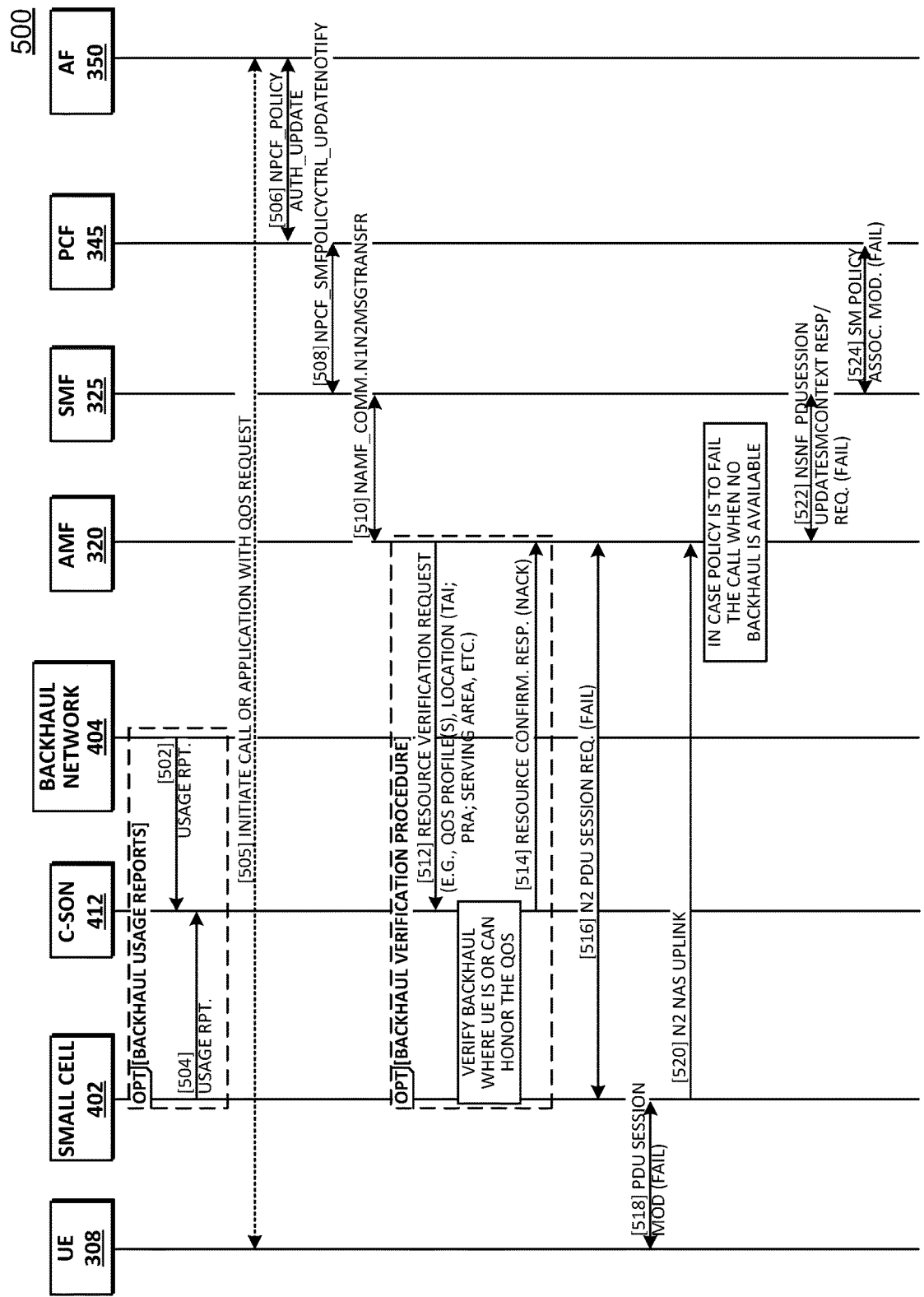
FIG. 5 illustrates a schematic signaling diagram of call flows for employing Self-Organizing Network (SON) techniques in the context of backhaul infrastructure.

Referring again to the figures, FIG. 5 illustrates a schematic signaling diagram 500 of call flows for employing Self-Organizing Network (SON) techniques between various network entities such as Network Functions (NFs) of SBA 132 and backhaul network 404. The call flows illustrates operations of the disclosed small cell backhaul procedure. As a general overview, the signals shown in diagram 500 show how the SON (here, C-SON automation platform 412, which can include PCMM 414) adjusts the bandwidth (e.g., increases bandwidth) when a utilization performance indicator exceeds a backhaul threshold limit for a backhaul service flow. Notably, in such instances, C-SON automation platform 412 can trigger a load balancing operation where UE 308 is migrated to a Macro cell and/or another Small cell. For example, C-SON automation platform 412 detects a high utilization on the backhaul link based on backhaul usage reports received at steps 502 and 504. Notably, C-SON automation platform 412 can send a request to a PCMM (e.g., an application manager such as PCMM 414 (not shown)), to operably increase the bandwidth for the backhaul link (e.g., the PCMM 414 may perform operations shown in diagram 10.2 of the PKT-SP-MM Packet Cable Multimedia Specification). As a result, the DOCSIS system, which is represented by the C-SON automation platform 412, allocates more bandwidth to the backhaul flow.

In greater detail, the call flows begin at steps 502 and 504, where C-SON automation platform 412 receives backhaul usage reports (e.g., bandwidth usage reports) from the backhaul network 404 and small cell 402 (e.g., a radio access network (RAN)). Notably, as illustrated, backhaul network 404 represents the above-discussed backhaul entities, e.g., cable modems (CMs 1-3), and CMTS 410.

Next, at step 505, UE 308 initiates a call and/or an application initiates execution on UE 308. The call and/or application includes a Quality of Service (QoS) request to Application Function (AF) 350. In response, AF 350 and PCF 345 exchange policy authorization updates at step 506 (e.g., in accordance with TS 23.502, clause 4.16.5.2). PCF 345 further exchanges SMF policy control update notification messages with SMF 345 at step 508 (e.g., in accordance with TS 23.503, clause 6.4). SMF 325 further exchanges data with AMF 320 at step 510, including QFI(s), QoS profiles, and session-AMBR (e.g., limits to aggregate bitrates) data.

Steps 512-514 represent a backhaul verification procedure, where C-SON automation platform 412 checks whether is there is enough bandwidth in the backhaul link to acknowledge (ack) a resource request. When the decision is based on current value plus additional bandwidth request should be below the threshold. In particular, at step 512, AMF 320 sends a resource verification request to C-SON automation platform 412, which includes QoS profile(s), location or location awareness (e.g., Extended Cell Global Identifier (ECGI), Tracking Area Identity (TAI), Presence Reporting Area (PRA), other serving area data, etc). Notably, the ECGI may be part of a User Location ID reports received from an AMF/MME network function.

C-SON automation platform 412 receives the resource verification request and verifies where the UE is or can honor the QoS. In particular, resource verification request provides information that is used to map IP flows to cells (e.g., ECGI, etc.), or any other location. Via this mapping, C-SON automation platform 412 can sum the throughput of UE(s), and correlate UE(s) to cell utilization and backhaul utilization. In addition, the C-SON automation platform 412 can determine whether there is enough bandwidth under this cell/backhaul to support another session or not, and/or enforce policy decisions (PCF) based on where the users (IP flows) are located. Next, at step 514, C-SON automation platform 412 sends a resource confirmation response (e.g., NACK) back to AMF 320.

Step 516 represents a setup of a PDU session. In particular, at step 516, small cell 402 and AMF 320 exchange a PDU session request (e.g., in accordance with TS 23.502, clause 4.3.3), and at step 518, UE 308 and small cell 402 exchange a PDU session modification signal. At step 520, small cell 402 sends a non-access stratum uplink request to AMF 320. Notably, from a network point of view, there is no change in the PDU session procedure. In a case where the policy is set to fail (e.g., when no backhaul bandwidth is available), AMF 320 and SMF 325 exchange PDU session update requests/responses to update the PDU context. Next, SMF 325 and PCF 345 exchange SM policy association modification messages.

Figure 6:
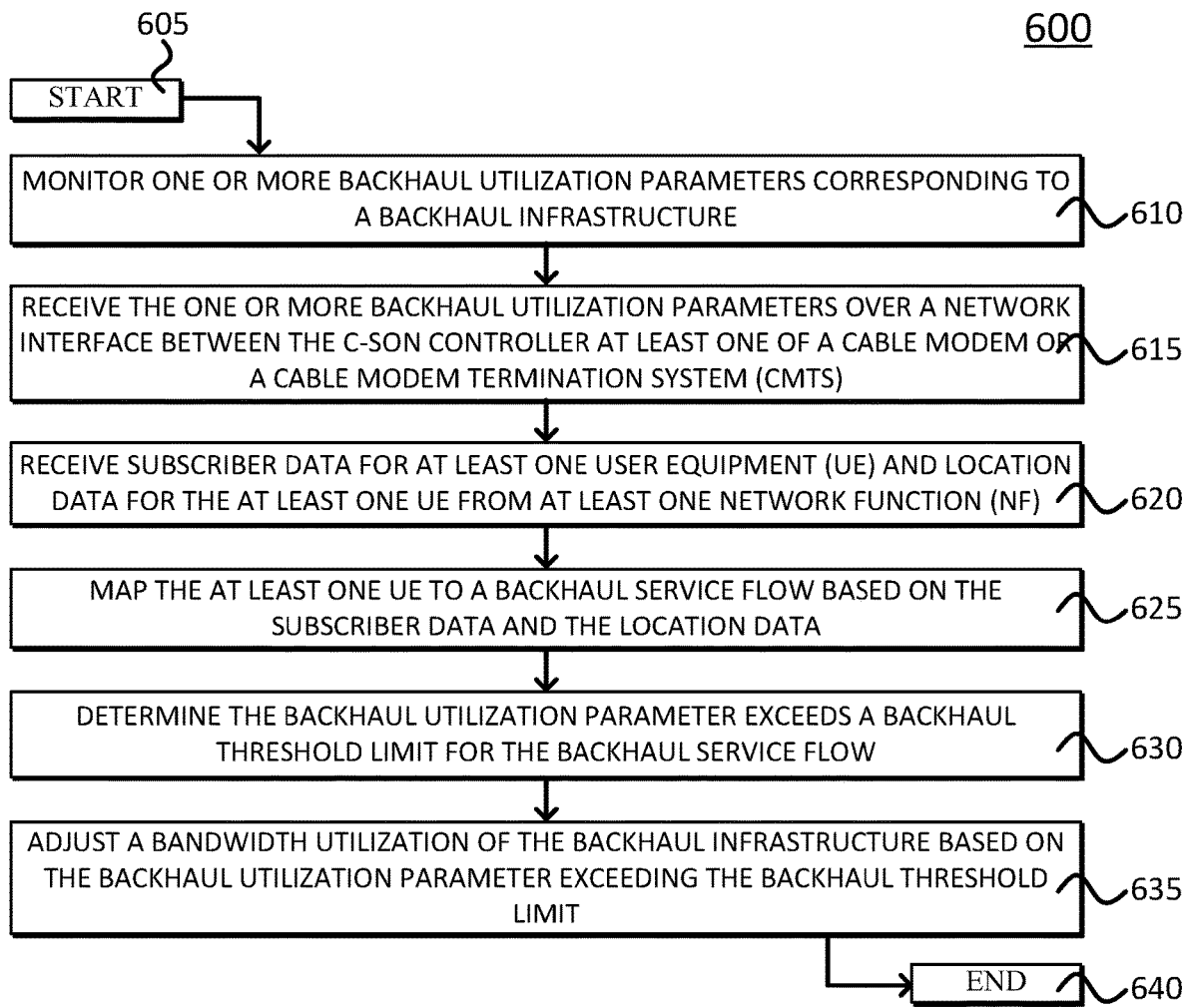
FIG. 6 illustrates an example simplified procedure for managing backhaul infrastructure for a telecommunication network using a Self-Organizing Network (SON) automation platform, in accordance with one or more examples this disclosure.

FIG. 6 illustrates an example simplified procedure 600 for managing backhaul infrastructure for a telecommunication network using a Self-Organizing Network (SON) automation platform. In particular, procedure 600 illustrates operations by a C-SON automation platform (e.g., C-SON automation platform 412) for backhauling data between a small cell and a corresponding data network in the context of a 5G telecommunication network.

Procedure 600 begins at step 605 and continues on to step 610 where, as discussed above, the C-SON automation platform monitors one or more backhaul utilization performance indicators corresponding to a backhaul infrastructure. Notably, the backhaul infrastructure, which can refer to backhaul network 404, operably transports data between one or more User Equipment (UE) connected to a small cell and a data network. Next, at step 615, the C-SON automation platform receives the one or more backhaul utilization performance indicator over one or more network interface(s) between the C-SON automation platform at least one of a cable modem or a Cable Modem Termination System (CMTS). For example, these network interfaces can refer to the CM1-x network interface and/or the CMTS-x network interface showing FIG. 4 (discussed above).

Next, the C-SON automation platform receives, at step 620, subscriber data and location data for a UE (e.g., UE 308). Here, the C-SON automation platform particularly receives the subscriber data from a Session Management Function (SMF) Network Function (e.g., SMF 325) over the C-SON/SMF-x network interface. In addition, the C-SON automation platform receives the location data for the UE from an Access and Mobility Management Function (AMF) (e.g., AMF 320) over a C-SON/AMF-x network interface. Notably, in some embodiments, the C-SON automation platform can receive the subscriber data and/or the location data from a shared network interface to a Network Exposure Function (NEF) entity in a 5G network.

The C-SON automation platform further maps, at step 625, the at least one UE to a backhaul service flow based on the subscriber data and the location data. Notably, the location data can include a cell ID such as an Extended Cell Global Identifier (ECGI) (which may be part of the User Location ID reports from an AMF/MME network function), as mentioned above, and the cell ID may be used to map the UE to the backhaul service flow. For example, the backhaul service flow can refer to a PDU session and/or a particular network slice for the UE.

Next, at step 630, the C-SON automation platform determines the backhaul utilization parameter exceeds a backhaul threshold limit for the backhaul service flow, and adjusts, at step 635, the bandwidth utilization of the backhaul infrastructure based on the same. For example, the C-SON automation platform can instruct a PacketCable MultiMedia (PCMM) (e.g., PCMM 414) entity to add bandwidth to the backhaul infrastructure and/or migrate the UE or group of UEs to a macrocell, and/or migrate the UE to a different small cell. Procedure 600 subsequently ends at step 640, but may return to step 610 where the C-SON automation platform monitors the backhaul utilization parameters.

Procedure 600 illustrates exemplary operations of a small cell backhaul process (e.g., process 244) where a C-SON automation platform (e.g., C-SON automation platform 412) performs Self Organizing Network (SON) monitoring and management for a service flow (e.g., a backhaul service flow) mapped to a specific UE (e.g., UE 308). As mentioned, this granular approach provides end-to-end monitoring and management of data sessions (e.g., backhaul service flows which can correspond to PDU data sessions and/or network slices) between a user and a corresponding data network.

It should be noted that certain steps within procedure 600 may be optional, and further, the steps shown in FIG. 6 are merely example steps for illustration. Further, while a particular order of the steps is shown, this ordering is merely illustrative, and any suitable arrangement of the steps may be utilized without departing from the scope of the embodiments herein.

The techniques described herein, therefore, describe new SON monitoring/management operations as well as new network interfaces in the context of a backhaul infrastructure for a cable access network. These techniques particularly help realize and improve end-to-end QoS, SLAB, KPIs, and so on, for data sessions on a granular, per user, (UE) basis.

While there have been shown and described illustrative examples of the SON monitoring/management techniques and corresponding operations in a specific network context (e.g., a backhaul network (DOCSIS) 404), it is to be understood that various other adaptations and modifications may be made within the spirit and scope of the embodiments herein. For example, the embodiments and operations disclosed herein have been described with respect to certain automation platforms, devices, NFs, interfaces, and systems, however it is appreciated that such embodiments are provided for purposes of example, not limitation and that the SON monitoring/management techniques disclosed herein can be incorporated as part of existing wireline/backhaul networks.

The foregoing description has been directed to specific embodiments. It will be apparent, however, that other variations and modifications may be made to the described embodiments, with the attainment of some or all of their advantages. For instance, it is expressly contemplated that the components, elements, and/or operations described herein can be implemented as software being stored on a tangible (non-transitory) computer-readable medium, devices, and memories (e.g., disks/CDs/RAM/EEPROM/ etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method for managing a backhaul infrastructure for a telecommunication network, the method comprising:
    monitoring, by a Centralized Self Organizing Network (C-SON) automation platform, one or more backhaul utilization performance indicators corresponding to a backhaul infrastructure, wherein the backhaul infrastructure transports data between one or more User Equipment (UE) connected to a small cell and a data network;
    receiving, by the C-SON automation platform, subscriber data for at least one User Equipment (UE) and location data for the at least one UE from at least one Network Function (NF);
    mapping, by the C-SON automation platform, the at least one UE to a network slice of a backhaul service flow between the small cell and the data network based on the subscriber data and the location data including a cell ID of the small cell;
    determining, by the C-SON automation platform, the one or more backhaul utilization performance indicators exceeds a backhaul threshold limit for the backhaul service flow; and
    adjusting, by the C-SON automation platform, a bandwidth utilization of the backhaul infrastructure based on the one or more backhaul utilization performance indicators exceeding the backhaul threshold limit.

2. The method of claim 1, wherein monitoring the one or more backhaul utilization performance indicators further comprises:
    receiving, by the C-SON automation platform, the one or more backhaul utilization performance indicators over a network interface between the C-SON automation platform and at least one of a cable modem or a Cable Modem Termination System (CMTS).

3. The method of claim 1, wherein receiving the subscriber data for the at least one UE and the location data for the at least one UE further comprises:
    receiving, by the C-SON automation platform, the subscriber data and the location data over a network interface between the C-SON automation platform and one or more core network entities for a 5G telecommunication network.

4. The method of claim 1, wherein receiving the subscriber data for the at least one UE and the location data for the at least one UE further comprises:
    receiving, by the C-SON automation platform, the subscriber data and the location data from a Network Exposure Function (NEF) entity in a 5G telecommunication network.

5. The method of claim 1, wherein the at least one NF is a core network entity for a 5G telecommunication network.

6. The method of claim 1, wherein receiving the subscriber data for the at least one UE comprises receiving the subscriber data from a Session Management Function (SMF) NF, and
    wherein receiving the location data for the at least one UE comprises receiving the location data from an Access and Mobility Management Function (AMF) NF.

7. The method of claim 1, wherein adjusting the bandwidth utilization further comprises:
    instructing, by the C-SON automation platform, a PacketCable MultiMedia (PCMM) entity to add bandwidth to the backhaul infrastructure.

8. The method of claim 1, wherein adjusting the bandwidth utilization further comprises:
    migrating the at least one UE to a macro cell by changing a mobility parameter for the UE to cause the UE to handover to the macro cell.

9. The method of claim 1, wherein adjusting the bandwidth utilization further comprises:
    migrating the at least one UE to a different small cell changing a mobility parameter for the UE to cause the UE to select the different small cell.

10. The method of claim 1, wherein adjusting the bandwidth utilization further comprises:
    instructing, by the C-SON automation platform, a Policy Control Function (PCF) to reduce the bandwidth utilization for the at least one UE.

11. A Centralized Self Organizing Network (C-SON) automation platform for managing a backhaul infrastructure in a telecommunication network, the automation platform comprising
    one or more network interfaces to communicate within the telecommunication network;
    a processor coupled to the network interfaces and adapted to execute one or more processes; and
    a memory configured to store instructions executable by the processor, wherein the instructions, when executed, are operable to:
        monitor one or more backhaul utilization performance indicators corresponding to a backhaul infrastructure, wherein the backhaul infrastructure transports data between one or more User Equipment (UE) connected to a small cell and a data network;
        receive subscriber data for at least one User Equipment (UE) and location data for the at least one UE from at least one Network Function (NF);
        map the at least one UE to a network slice of a backhaul service flow between the small cell and the data network based on the subscriber data and the location data including a cell ID of the small cell;

determine the one or more backhaul utilization performance indicators exceeds a backhaul threshold limit for the backhaul service flow; and adjust a bandwidth utilization of the backhaul infrastructure based on the one or more backhaul utilization performance indicators exceeding the backhaul threshold limit.

12. The C-SON automation platform of claim 11, wherein the instructions to monitor the one or more backhaul utilization parameters are further operable to:

receive the one or more backhaul utilization performance indicators over a network interface between the C-SON automation platform and at least one of a cable modem or a Cable Modem Termination System (CMTS).

13. The C-SON automation platform of claim 11, wherein the instructions to receive the subscriber data for the at least one UE and the location data for the at least one UE are further operable to:

receive the subscriber data and the location data over a network interface between the C-SON automation platform and one or more core network entities for a 5G telecommunication network.

14. The C-SON automation platform of claim 11, wherein the instructions to receive the subscriber data for the at least one UE and the location data for the at least one UE are further operable to:

receive the subscriber data and the location data from a Network Exposure Function (NEF) entity in a 5G telecommunication network.

15. The C-SON automation platform of claim 11, wherein the instructions to receive the subscriber data for the at least one UE are further operable to receive the subscriber data from a Session Management Function (SMF) NF, and wherein the instruction to receive the location data for the at least one UE are further operable to receive the location data from an Access and Mobility Management Function (AMF) NF.

16. The C-SON automation platform of claim 11, wherein the instructions to adjust the bandwidth utilization are further operable to:

instruct a PacketCable MultiMedia (PCMM) entity to add bandwidth to the backhaul infrastructure.

17. The C-SON automation platform of claim 11, wherein the instructions to adjust the bandwidth utilization are further operable to perform at least one of a migration for the at least one UE to a macrocell or a migration for the at least one UE to a different small cell.

18. A tangible, non-transitory, computer-readable media having instructions encoded thereon, the instructions, when executed by a processor of a Centralized Self Organizing Network (C-SON) automation platform, are operable to:

monitor one or more backhaul utilization performance indicator corresponding to a backhaul infrastructure, wherein the backhaul infrastructure transports data between one or more User Equipment (UE) connected to a small cell and a data network;

receive subscriber data for at least one User Equipment (UE) and location data for the at least one UE from at least one Network Function (NF);

map the at least one UE to a network slice of a backhaul service flow between the small cell and the data network based on the subscriber data and the location data including a cell ID of the small cell;

determine the one or more backhaul utilization performance indicators exceeds a backhaul threshold limit for the backhaul service flow; and adjust a bandwidth utilization of the backhaul infrastructure based on the one or more backhaul utilization parameters exceeding the backhaul threshold limit.

19. The tangible, non-transitory, computer-readable media of claim 18, wherein the instructions to monitor the one or more backhaul utilization parameters are further operable to:

receive the one or more backhaul utilization parameters over a network interface between the C-SON automation platform and at least one of a cable modem or a Cable Modem Termination System (CMTS).

20. The tangible, non-transitory, computer-readable media of claim 18, wherein the instructions to receive the subscriber data for the at least one UE and the location data for the at least one UE are further operable to:

receive the subscriber data and the location data over a network interface between the C-SON automation platform and one or more core network entities for a 5G telecommunication network.

* * * * *